(12) United States Patent
Scalzo, III et al.

(10) Patent No.: US 10,158,206 B2
(45) Date of Patent: Dec. 18, 2018

(54) BRUSH HOLDER APPARATUS AND BRUSH SPRING HAVING FRICTION ENHANCING MATERIAL

(71) Applicant: General Electric Company, Schenectady, NY (US)

(72) Inventors: Frank Austin Scalzo, III, New Hartford, NY (US); Eric Steven Buskirk, Scotia, NY (US); Benjamin Alber Mancuso, Glenville, NY (US); Curtis Maurice Hebert, Schenectady, NY (US); Matthew Thomas Preston, Middletown, CT (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 15/486,612

(22) Filed: Apr. 13, 2017

(65) Prior Publication Data

US 2018/0301860 A1    Oct. 18, 2018

(51) Int. Cl.
*H02K 13/00* (2006.01)
*H01R 39/38* (2006.01)
*H02K 5/14* (2006.01)

(52) U.S. Cl.
CPC ............. *H01R 39/381* (2013.01); *H02K 5/14* (2013.01); *H02K 13/00* (2013.01)

(58) Field of Classification Search
CPC ......... H01R 39/381; H02K 5/14; H02K 13/00
USPC ................................. 310/239–353, 219–328
See application file for complete search history.

(56) References Cited

U.S. PATENT DOCUMENTS

| | | | | |
|---|---|---|---|---|
| 2,862,124 A * | 11/1958 | Huber | ..... | H01R 39/40 310/246 |
| 3,017,529 A * | 1/1962 | Helwig | ..... | H01R 39/26 310/248 |
| 3,423,618 A * | 1/1969 | Parez | ..... | H01R 39/40 310/240 |
| 3,968,391 A | 7/1976 | Blank | | |
| 4,296,346 A | 10/1981 | Ooki | | |
| 5,043,619 A | 8/1991 | Kartman | | |
| 7,564,160 B2 | 7/2009 | Cutsforth | | |
| 7,608,970 B2 * | 10/2009 | Eger | ..... | H01R 39/40 29/732 |
| 8,618,943 B2 * | 12/2013 | Cutsforth | ..... | H01R 39/58 340/635 |

(Continued)

*Primary Examiner* — Thanh Lam
(74) *Attorney, Agent, or Firm* — James W. Pemrick; Ernest G. Cusick; Frank A. Landgraff (57) ABSTRACT

A brush holder apparatus includes a stationary support member having at least one groove, a fork electrical connector, and a conductive bar configured to pass through a portion of a main body of the stationary support member. The conductive bar provides electrical conductivity with a collector mount and fork electrical connector. A brush holder is releasably affixed to the stationary support member, and has at least one rail that slides along the groove(s). The brush holder has a knife electrical connector that mates with the fork electrical connector. A brush spring is clipped on the brush holder, and presses a brush against a collector of a dynamoelectric machine. The brush spring is replaceable in the brush holder. The brush spring or brush holder has a friction enhancing material attached to an area where the brush spring attaches to the brush holder.

20 Claims, 11 Drawing Sheets

(56) References Cited

U.S. PATENT DOCUMENTS

| | | | | |
|---|---|---|---|---|
| 2015/0303634 A1* | 10/2015 | Eger | ............... | H01R 43/12 |
| | | | | 439/29 |
| 2015/0035777 A1 | 12/2015 | Steinbach | | |
| 2015/0035778 A1 | 12/2015 | Steinbach | | |
| 2015/0035779 A1 | 12/2015 | Steinbach | | |
| 2015/0035780 A1 | 12/2015 | Steinbach | | |
| 2015/0357780 A1* | 12/2015 | Steinbach | ............ | H01R 39/385 |
| | | | | 310/68 B |

* cited by examiner

BRUSH HOLDER APPARATUS AND BRUSH SPRING HAVING FRICTION ENHANCING MATERIAL

BACKGROUND OF THE INVENTION

The subject matter disclosed herein relates to a brush holder apparatus and system. Specifically, the subject matter disclosed herein relates to a brush holder apparatus with a brush spring combined with friction gripping material.

Conventional dynamoelectric machines include a rotor having windings that conduct electrical current during operation of the machine. As the rotor rotates, rotating elements are used to conduct current to the rotor windings from a source external to the rotor. The rotating elements such as collector rings or commutators make contact with brushes to conduct the current. As the brushes are stationary with respect to the rotating elements, the brushes, which are made of carbon, wear due to friction and need periodic replacement.

Due to a desire to decrease downtime during operation of the dynamoelectric machine, brushes are sometimes replaced during operation of the dynamoelectric machine. In order to replace brushes safely, an operator uses a single hand (in order to avoid conducting electrical current through the operator's body). Conventional brush holders can be heavy and unwieldy, making brush replacement both difficult and dangerous.

BRIEF DESCRIPTION OF THE INVENTION

According to an aspect of the disclosure, a brush holder apparatus includes a stationary support member having at least one groove. The stationary support member has a fork electrical connector. The stationary support member has a conductive bar configured to pass through a portion of a main body of the stationary support member, and the conductive bar is configured to provide electrical conductivity with a collector mount and the fork electrical connector. A brush holder is configured to be releasably affixed to the stationary support member, and the brush holder has at least one rail configured to slide along the at least one groove or two grooves. The brush holder has a knife electrical connector configured to mate with the fork electrical connector. A brush spring is configured to be clipped on the brush holder. The brush spring is configured to press a brush against a collector of a dynamoelectric machine, and the brush spring is configured to be replaceable in the brush holder. At least one of the brush spring or brush holder has a friction enhancing material attached to an area where the brush spring attaches to the brush holder. The stationary support member is configured for electrical connection to a collector mount and the brush holder is configured to retain a brush.

According to another aspect of the disclosure, a brush spring for a dynamoelectric machine is provided. The brush spring is configured to be clipped on a brush holder. The brush spring is configured to press a brush against a collector of a dynamoelectric machine. The brush spring is configured to be replaceable in the brush holder. The brush spring has a friction enhancing material located in an area where the brush spring attaches to the brush holder. The friction enhancing material is at least one of, rubber, natural rubber, synthetic rubber, butadiene rubber, styrene-butadiene rubber, neoprene, polysulfide rubber, butyl rubber, or silicone.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Aspects of the disclosure provide for a brush holder assembly (or apparatus) configured to conduct electrical current between a brush and a rotating element of a dynamoelectric machine (e.g., an electrical generator, electrical motor, etc.) and/or another rotating machine (e.g., a rotating crane). In particular, aspects provide for a brush holder assembly having a brush spring with friction gripping material that aids an operator in safely removing/replacing brush springs in a dynamoelectric machine and/or another rotating machine.

As described herein, conventional dynamoelectric machines include a rotor having windings that conduct electrical current during operation of the machine. As the rotor rotates, rotating elements are used to conduct current to the rotor windings from a source external to the rotor. The rotating elements such as collector rings or commutators make contact with brushes to conduct the current. As the brushes are stationary with respect to the rotating elements, the brushes, which are made of carbon, wear due to friction and need periodic replacement.

Due to a desire to decrease downtime during operation of the dynamoelectric machine, brushes are sometimes replaced during operation of the dynamoelectric machine. In order to replace brushes safely, an operator uses a single hand (in order to avoid conducting electrical current through the operator's body). Conventional brush holders can be heavy and unwieldy, making brush replacement both difficult and dangerous.

In contrast to conventional brush holders, aspects of the disclosure include a brush holder apparatus for a dynamo-electric machine including a rotating cam brush retainer. This cam-style brush retainer may allow for efficient and safe installation and/or removal of brushes from dynamo-electric machines. In addition, the brush holder has a replaceable clip-on brush spring that has a friction enhancing material attached to an area on the brush spring where it attached to the brush holder. Alternatively, the brush holder has the friction enhancing material attached to an area where the brush holder attaches to the brush spring.

Figure 1:
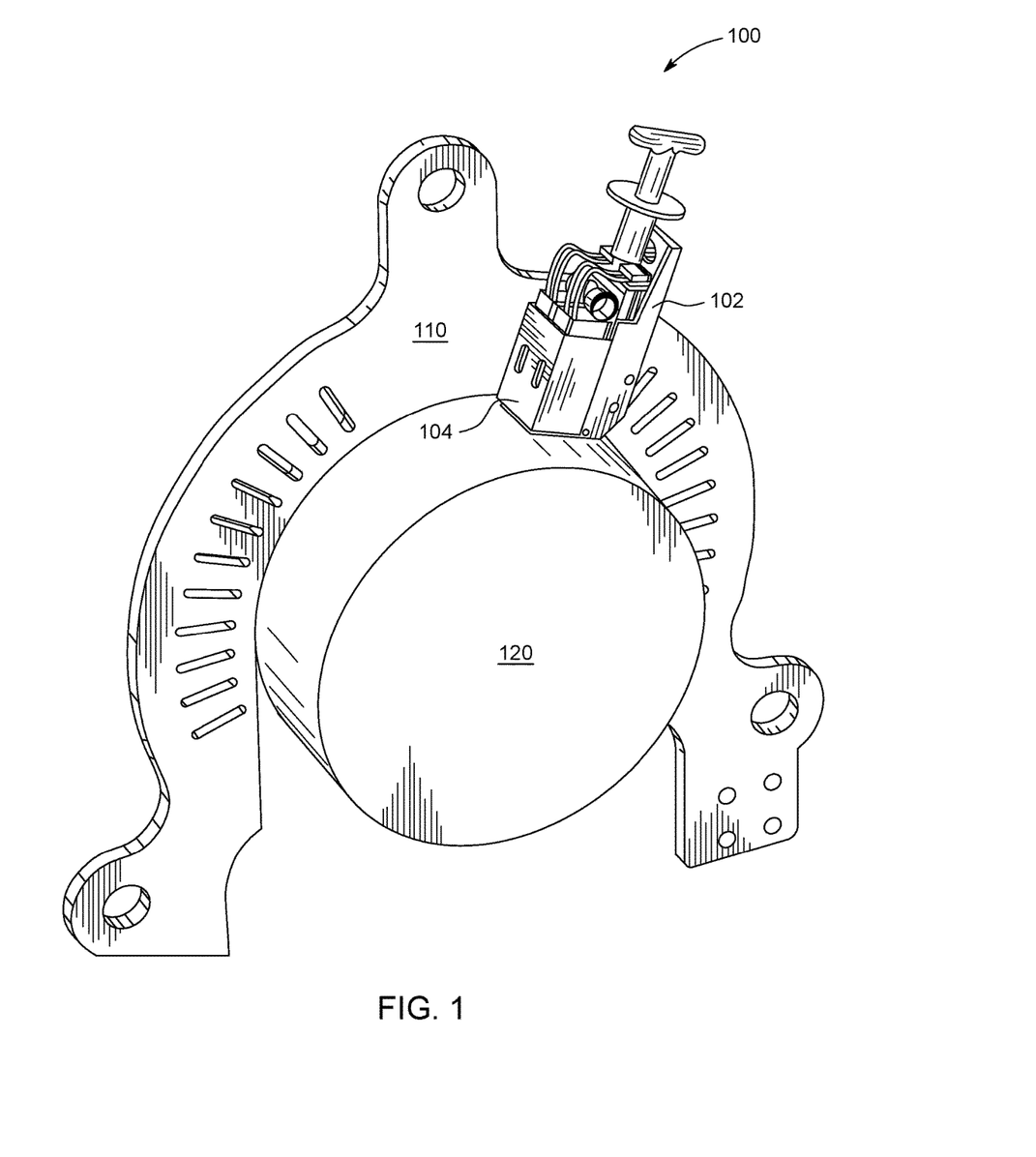
FIG. 1 illustrates a partial perspective view of a single brush holder installed on a collector horseshoe, according to an aspect of the present disclosure.

FIG. 1 illustrates a partial perspective view of a single brush holder apparatus 100 installed on a collector horseshoe, according to an aspect of the present disclosure. A brush mount or collector horseshoe 110 is mounted over a collector ring 120. The collector ring rotates along with the rotor (not shown). A plurality of brushes and corresponding brush holders are attached to the collector horseshoe and are distributed at least partially around the collector ring. In this example, only a single brush holder apparatus 100 is shown attached to the collector horseshoe 110. The brush holder apparatus 100 may be bolted or screwed to the collector horseshoe, or any other suitable method may be employed. The brush holder apparatus 100 includes a stationary support member 102 and a brush holder 104. The stationary support member 102 is configured for electrical connection to the collector mount 110 (i.e., collector horseshoe 110), for example, by being fabricated of a conductive material or including a conductive material. The brush holder 104 is configured to retain the brush(es) (contained therein) at least in the axial and circumferential directions.

Figure 2:
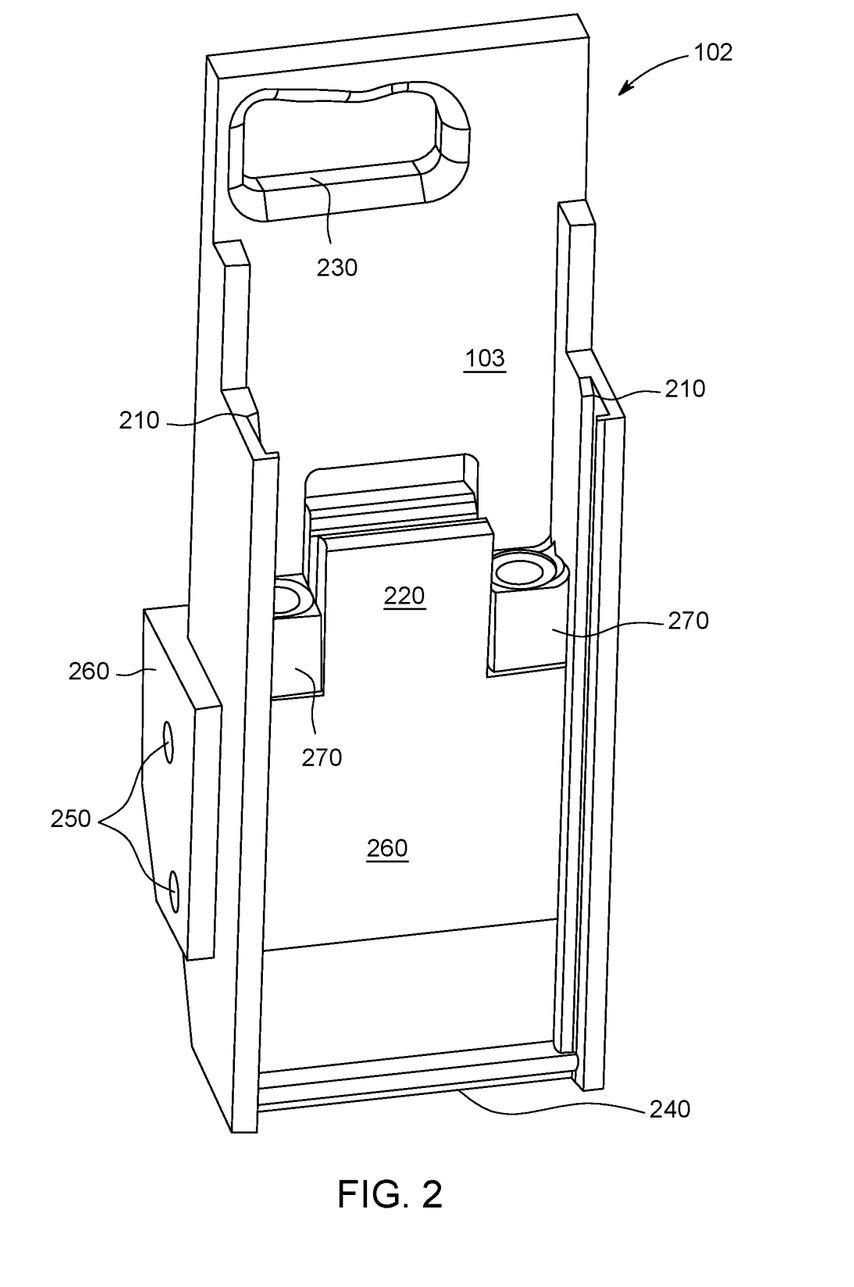
FIG. 2 illustrates a perspective view of the stationary support member, according to an aspect of the present disclosure.

FIG. 2 illustrates a perspective view of the stationary support member 102, according to an aspect of the present disclosure. The stationary support member 102 includes at least one groove 210 (two are shown in FIG. 2) and a fork electrical connector 220. The fork electrical connector 220 may extend to one or both sides of the stationary support member, or alternatively the fork electrical connector may only be centrally located without extending to the sides of the stationary support member. A tapered slot 230 is located in an upper portion of the stationary support member 102, and the slot 230 is configured for cooperation with a locking pin 450 on the brush holder. The locking pin could also be replaced by a bar or latch or protrusion or disc with a ramped surface. The tapered nature of slot 230 acts to force the brush holder down into the connector 220 as the locking pin 450 is rotated. A bar 240 is located near a bottom end of the stationary support member 102, and this bar is configured to engage and restrain a cam on the brush holder 104. The bar 240 also serves to limit the distance the brush holder 104 can be inserted into the stationary support member 102. The brush holder 104 is fixed in position relative to the stationary support member 102 between the locking pin 450 at top and the bar 240 at the bottom. The bar 240 is fully contained within the profile of the stationary support member 102 and does not protrude past that profile. A plurality of holes 250 are provided and are configured to facilitate attachment of the stationary support member 102 to the collector mount (or collector horseshoe 110). The holes 250 may be internally threaded for use with mechanical fasteners, such as bolts or screws. In addition, the holes 250 may be provided on both sides of the stationary support member 102 so that they are configured to attach a plurality of stationary support members together in a stacked or side-by-side arrangement. This may be desired when multiple brushes are stacked side-by-side. For example, 3, 4, 5, 6, 7 or more brushes may be arranged at one circumferential location on collector horseshoe 110. A conductive bar 260 is located on one or more sides of the stationary support member 102. The conductive bar 260 is configured to provide electrical conductivity with the collector mount (collector horseshoe 110) and/or a second stationary support member (e.g., connected to the side of the first stationary support member).

Figure 3:
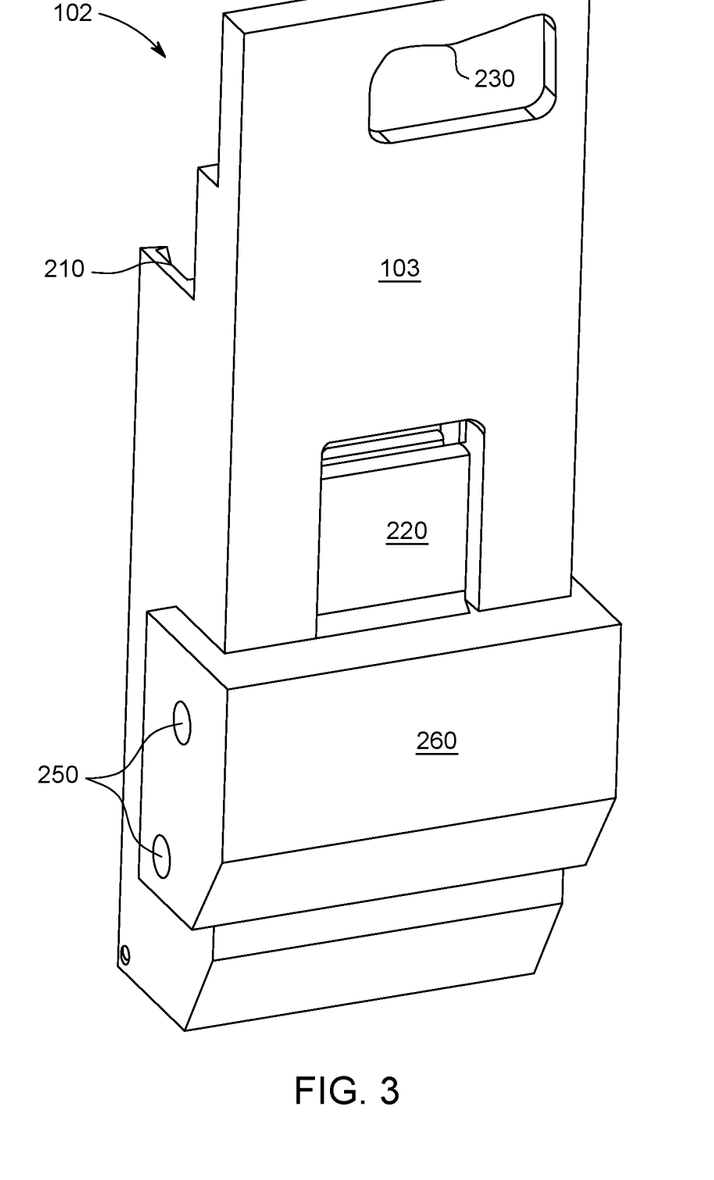
FIG. 3 illustrates a perspective rear view of the stationary support member 102 as shown in FIG. 2, according to an aspect of the present disclosure.

FIG. 3 illustrates a perspective rear view of the stationary support member 102 as shown in FIG. 2, according to an aspect of the present disclosure. The conductive bar 260 passes through a portion of the stationary support member's main body 103, and is configured to provide electrical conductivity with the collector mount 110 and the fork electrical connector 220. This arrangement enables the stationary support member 102 to be fully electrically insulated and the current to pass from the horseshoe 110 to the fork 220 through the conductive bar 260. The holes 250 to mount to the horseshoe 110 are formed in conductive bar 260. In alternative embodiments, the conductive bar 260 may be lengthened so that multiple stationary supports 102 could be attached to the same (longer) conductive bar 260. The conductive bar 260 may be attached to the stationary support 102 and the fork electrical connector 220 via bolts (not shown) that run down through tabs 270 and into the stationary support, and into or through the conductive bar 260. In this example, one tab/boss 270 is shown on each side of the electrical fork 220. The fork electrical connector 220 may also be formed integrally with the conductive bar 260.

The stationary support member 102 may be configured to accept one, two (as shown), three, or more brush holders. One aspect would be a stationary support member that accepts one, two or three brushes, and multiple stationary support members and can be arranged side-by-side for applications needing a specific number of brushes at a given circumferential location on the collector horseshoe. The stationary support member 102 and/or the brush holder may be formed substantially (or comprised) of aluminum, an aluminum alloy, stainless steel or any other suitable electrically conductive or electrically non-conductive material as desired in the specific application. As one non-limiting example only, the stationary support member 102 and the brush holder 104 may be formed substantially (or comprised) of a passivated or anodized aluminum, or a passivated or anodized aluminum alloy. This material will give good strength while providing an electrically insulating or electrically semi-insulating material. It is desired to minimize current flow through the brush holder body and focus the current flow through the brushes and electrical path of the brush holder designed for this current flow. In addition, it would be desirable to minimize (or even block) any current flow to portions that may be grasped by a technician during insertion or removal. Also, it is desirable to avoid the possibility of current arcing directly from the collector ring 120 to the brush holder 104 or to the stationary support member 102 when a brush 432 is worn out and no longer able to be part of the path for the current. At least a portion of a surface of at least one of the stationary support member and the brush holder is configured to be substantially electrically insulating. For example, the handle of the brush holder should be substantially electrically insulating to protect a technician during insertion or removal of the brush holder on an operating machine. Alternatively, the stationary support member and the brush holder may be formed substantially (or comprised) of a powder coated or painted aluminum or a powder coated or painted aluminum alloy or a powder coated metallic or non-metallic material or a ceramic coated metallic or ceramic coated non-metallic material.

Figure 4:
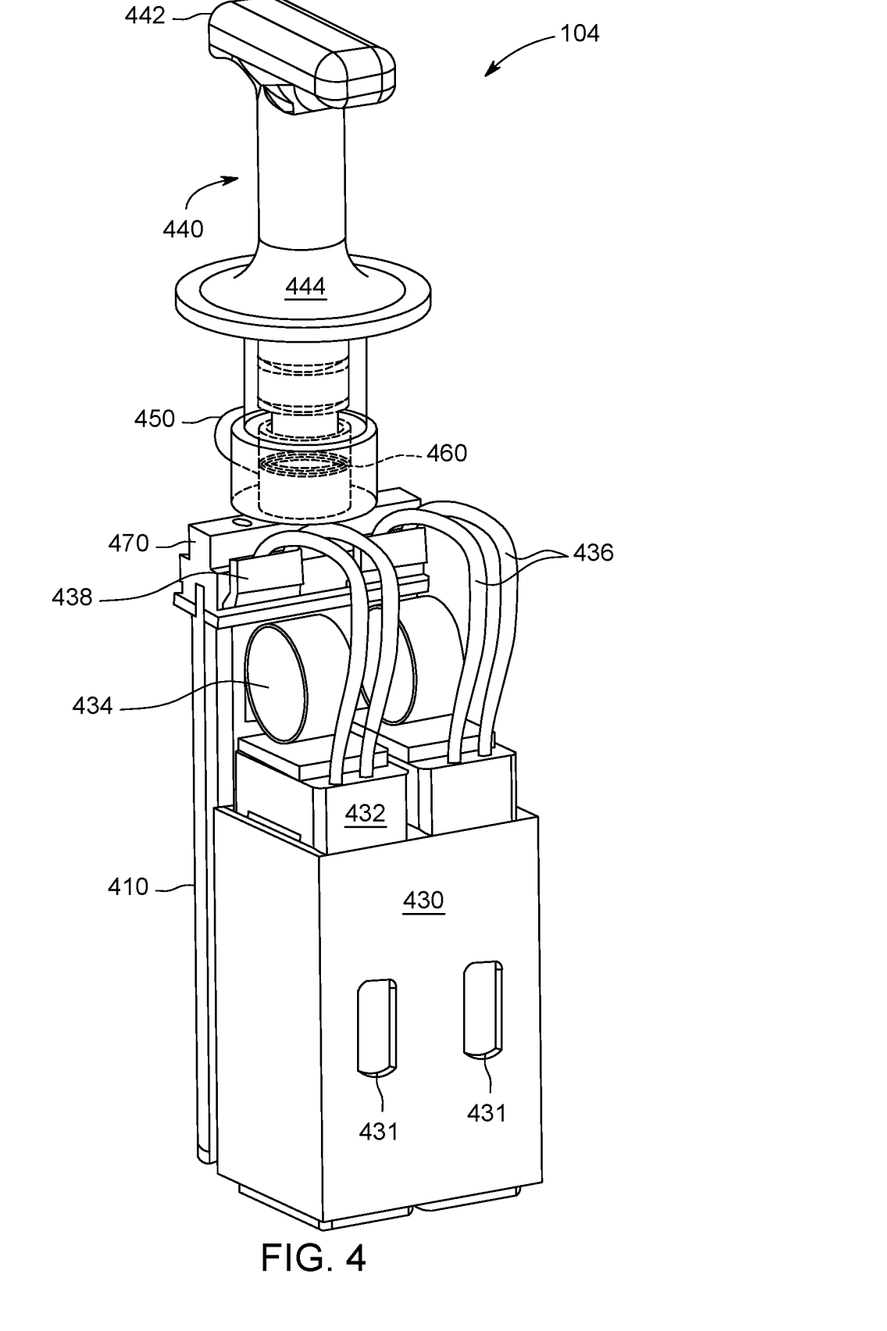
FIG. 4 illustrates a perspective front view of the brush holder, according to an aspect of the present disclosure.
Figure 5:
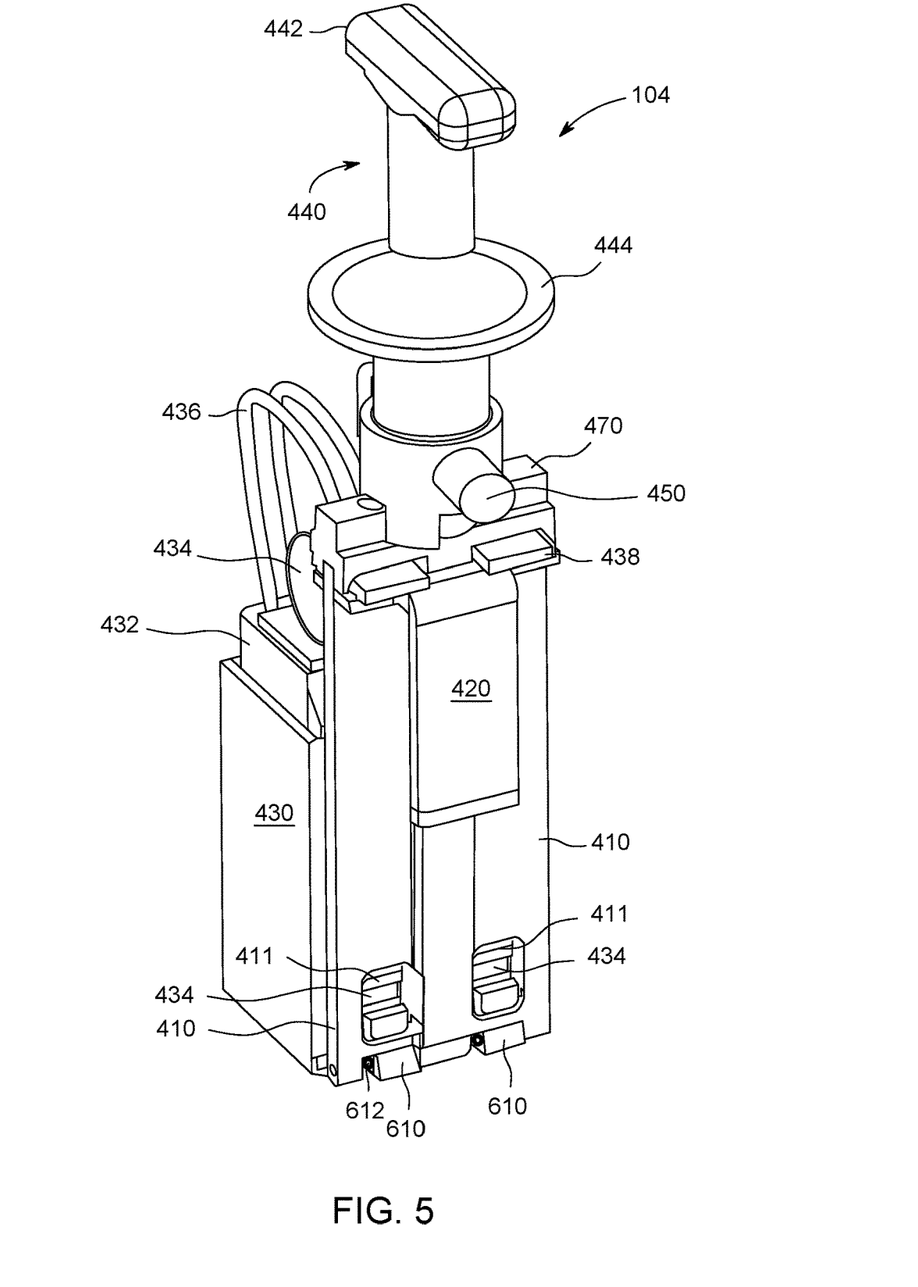
FIG. 5 illustrates a perspective rear view of the brush holder, according to an aspect of the present disclosure.

FIG. 4 illustrates a perspective front view of the brush holder 104, according to an aspect of the present disclosure. FIG. 5 illustrates a perspective rear view of the brush holder 104, according to an aspect of the present disclosure. The brush holder 104 is configured to be releasably affixed to the stationary support member 102. At least one rail 410 is configured to slide along groove 210. In the example shown the brush holder 104 includes two rails 410, one on each side of the brush holder. A knife electrical connector 420 (shown in FIG. 5), configured to mate with the fork electrical connector 220, is located on the rear of the brush holder 104. A brush retaining box 430 retains one or more brushes 432 in the axial and circumferential directions. In the example shown, box 430 retains two brushes 432. The brushes 432 are biased radially downward by brush springs 434. Apertures 431 form windows in the box 430 and allow the brushes 432 to be seen and visually monitored for wear.

The brush holder 104 includes a handle assembly 440 that includes an electrically insulating handle 442 and an electrically insulating guard 444 or shield that is located between the handle 442 and the brush connector leads 436. The brush connector leads 436 carry high voltage and current while the dynamoelectric machine is operating, so these present a hazard to be avoided. The electrically insulating handle 442 and guard 444 will prevent a technician's hand from coming into contact with the energized brush connector leads 436. The handle 442 and guard 444 may be comprised of plastic, rubber, epoxy/fiberglass laminate, fiberglass, or any other suitable electrically insulating material.

The locking pin 450 is configured for cooperation with the tapered slot 230 in the stationary support member 102. The handle assembly 440 can rotate, and as it rotates the locking pin 450 is rotated into, or out of, the tapered slot 230. The views of FIGS. 4 and 5 show the locking pin 450 and handle 442 oriented in the locked position. In this locked position the locking pin 450 is fully inserted into the slot 230 and the tapered surface drives the locking pin radially downward. In other words, the handle assembly 440 is configured to be rotated about 90 degrees, a 0 degree position configured so that the locking pin 450 is disengaged from the tapered slot 230 so that the brush holder 104 may be removed from the stationary support member 102. A 90 degree position (as shown in FIGS. 4 and 5) is configured so that the locking pin 450 is engaged in the tapered slot 230 so that the brush holder 104 is fully locked into operating condition on the stationary support member 102. By having the handle 442 oriented parallel to the locking pin 450 and having the locking pin 450 extend through the tapered slot 230, the operator can easily see that the brush holder 104 is fully inserted and locked in place within the stationary support 102.

A spring assembly 460 is housed within the handle assembly 440, and the spring assembly is mechanically connected to the brush terminal compression plate 470 (two of which are shown). The brush terminal compression plate may be one piece that extends through the shaft of the handle, but it could also be fabricated from two pieces. The brushes 432 are connected to the brush terminals 438 via brush connector leads (or pigtails) 436. The brush terminals 438 are electrically connected to the knife electrical connector 420. For example, the knife electrical connector includes an electrically conductive base member that extends under each brush terminal 438, thereby making an electrically conductive path. The spring assembly 460 biases the compression plates 470 downward and this downward pressure retains the brush terminals in place and against the base member of the knife electrical connector 420. This is particularly advantageous when the brush holder 104 is being inserted (or removed from) the stationary support member 102. It is advised to use only one hand when manually inserting or removing the brushes, and the spring assembly ensures that a second hand is not required to keep the brush terminals 438 in place. Once the brush holder 104 is fully inserted into the stationary support member, the handle 442 is rotated 90 degrees (into a locked position) and the tapered slot 230 forces the locking pin 450 (as well as brush holder 104) radially downward applying additional force onto the brush terminals 438. An advantage of this design is that the brush holder 104 is configured to clamp a brush terminal 438 between a terminal compression plate 470 and an opposing surface of the brush holder (i.e., the electrically conductive base member of knife electrical connector 420), so that the brush terminal is engaged or released manually, only by hand or without the use of any tools. All that is required is manual placement of the respective parts by hand. Minimizing or eliminating the use of specific tools can greatly simplify and increase the safety of working around dynamoelectric machines, especially when they are operating and energized.

As illustrated, the brush box 430 is configured to hold two brushes 432. However, the box 430 can be configured to hold one brush 432 (by reducing the width of the box) or three or more brushes (by increasing the width of the box and providing additional individual brush apertures). The brush terminal 438 includes a downward bend located at a proximal end thereof. This bend helps to keep the brush terminal in place under the compression plate 470. A hole or notch could also be provided in the brush terminal that cooperates with a complementary feature on the terminal compression plate 470 or the electrically conductive base member of knife electrical connector 420. For example, if the brush terminal 438 included a hole in the center thereof, the compression plate 470 could have a complementary pin located to engage the hole of the brush terminal. This complementary feature on the brush holder facilitates securing the brush terminal to the brush holder. The inverse could also be used, with the brush terminal having a complementary pin and the compression plate having the hole. With this arrangement, the brush holder 104 is configured to electrically and mechanically connect the knife electrical connector 420 to the brush terminal 438, while both the knife electrical connector 420 and the brush terminal 438 are electrically insulated from handle 442.

As the brush 432 wears down due to frictional contact with the rotor collector ring 120, the brush spring 434 will keep the eroding surface of the brush 432 in contact with the rotor collector ring 120. The brush spring 434 is configured to press the brush 432 radially downward and against the collector ring 120, because the spring 434 is designed with tension to re-coil itself. In this manner, the coil at the top of the spring 434 wants to re-tighten or coil downward, thereby applying a radially downward force to brush 432. The spring 434 is clipped on the bottom of the brush holder 104. For example, a lower part of main body portion 411 of the brush holder is where the brush spring 434 attaches to the brush holder. The bottom of the brush spring 434 is U-shaped, and the U-portion fits over and clips onto lower part of main body portion 411. The brush spring 434 is also configured to be located in-line with, or offset by 90 degrees from, the cam member 610 configured for restraining the brush 432 against the brush holder or box 430. This in-line arrangement is aligned so that any potential binding is reduced or eliminated and smooth operation is permitted between the spring 434, brush 432 and cam members 610.

Figure 6:
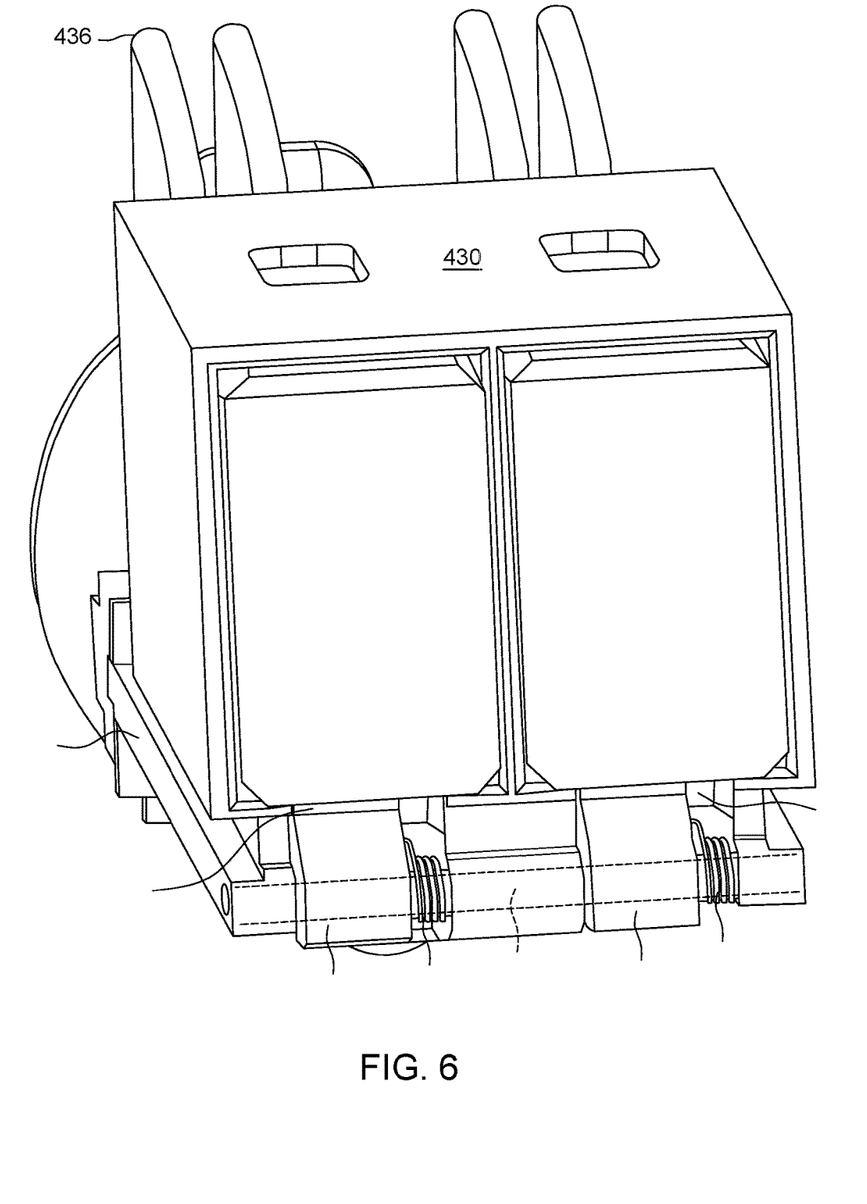
FIG. 6 illustrates a bottom view of the brush holder and the cam members used to retain the brushes, according to an aspect of the present disclosure.

FIG. 6 illustrates a bottom view of the brush holder 104 and the cam members 610 used to retain the brushes 432, according to an aspect of the present disclosure. A cam member 610 is operably connected to the shaft 620 near a bottom of the brush holder 104. The cam member 610 is configured to retain the brush 432 against the brush holder or box 430 until the brush holder 104 is fully inserted in the stationary support member 102. The cam member 610 may be constant-angle cam shaped, or have an arcuate toothed shape and is mounted with a spring 612 (e.g., a torsional spring) to shaft 620. The constant-angle cam shape and arcuate toothed shape may be consistent with logarithmic spiral geometry. That means that no matter how much the cam member 610 is rotated in order to reach the brush 432 surface, the cam 610 will contact the brush 432 with the same angle and same large force to resist sliding of the brush within the brush holder 104. Not all brushes may be exactly the same size so it is important that each cam member 610 is free to independently rotate on the shaft 620 to the fill the actual gap between the shaft 620 and the corresponding brush 432 surface.

Figure 7:
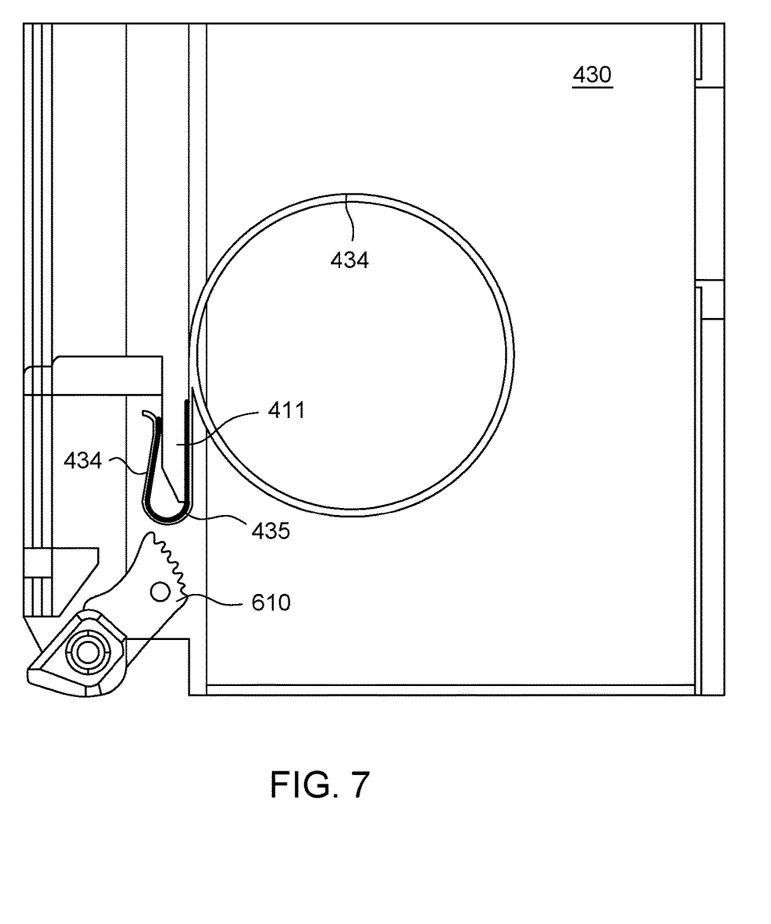
FIG. 7 illustrates a partial cross-sectional view of the brush holder with the brush spring attached thereto, according to an aspect of the disclosure.

FIG. 7 illustrates a partial cross-sectional view of the brush holder 430 with the brush spring 434 attached thereto, according to an aspect of the disclosure. The brush spring 434 is attached to the brush holder 430 at tab 411. Tab 411 is the area or part of the brush holder where the clip end of the brush spring 434 attaches to the brush holder. The brush spring 434 has a coiled spring at one end thereof and a U-shaped clip portion at the opposing end of the brush spring. The U-shaped clip portion of the brush spring is placed over the tab 411 for the brush holder. A friction enhancing material 435 is placed or formed on the clip portion of the brush spring, and is located in an area where the brush spring attaches to the brush holder. The friction enhancing material 435 may be at least one of rubber, natural rubber, synthetic rubber, butadiene rubber, styrene-butadiene rubber, neoprene, polysulfide rubber, butyl rubber, or silicone. The friction enhancing material may be applied by dipping the clip end of the brush spring in a liquid or flowable quantity of the friction enhancing material, or the friction enhancing material may be adhesively bonded to the brush spring or painted thereon. The friction enhancing material 435 provides a high friction or grippable surface that resists movement between the brush spring and brush holder, thereby keeping the brush spring on and attached to the brush holder and specifically region 411 of the brush holder.

Figure 8:
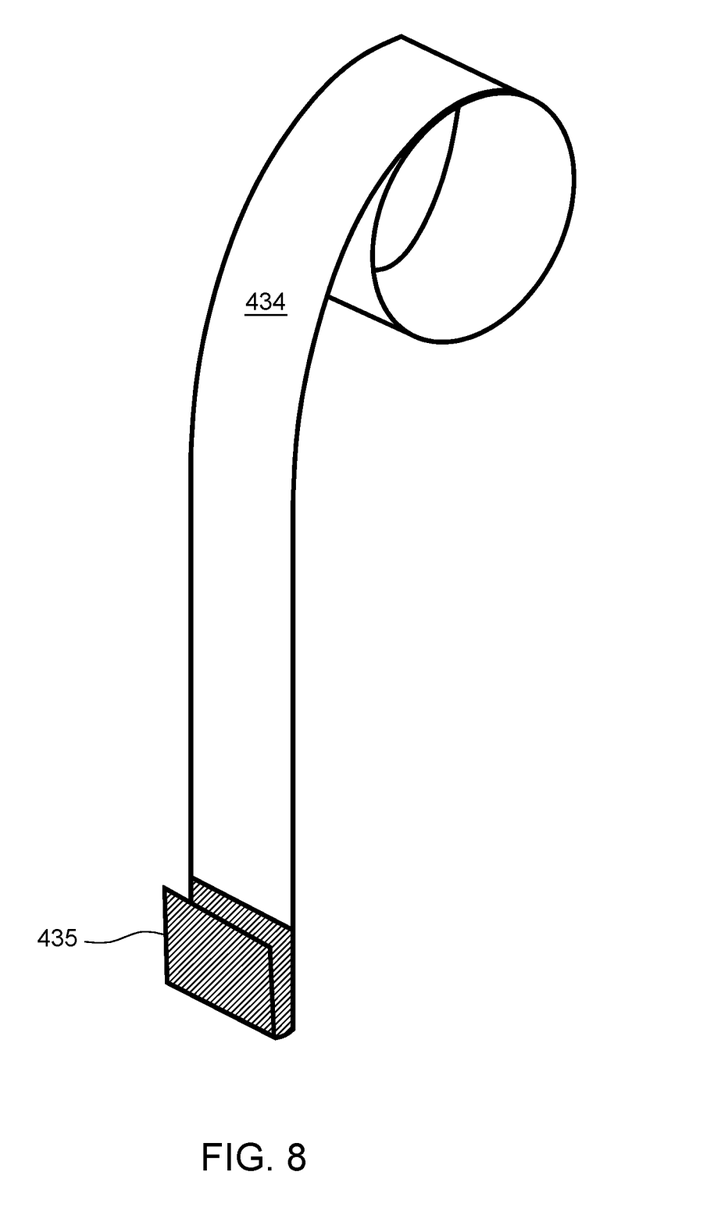
FIG. 8 illustrates a schematic version of the brush spring with the friction enhancing material located on the clip end of the brush spring, according to an aspect of the disclosure.
Figure 9:
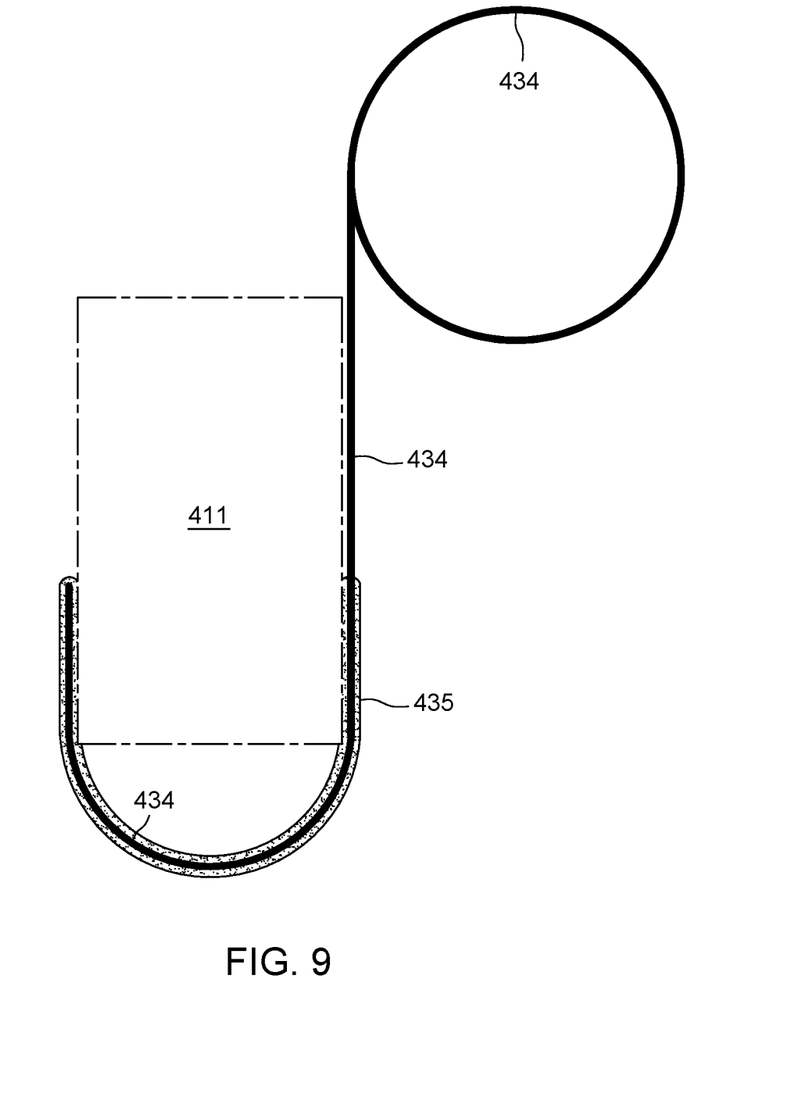
FIG. 9 illustrates a cross-sectional view of the brush spring having the friction enhancing material applied thereon, according to an aspect of the disclosure.
Figure 10:
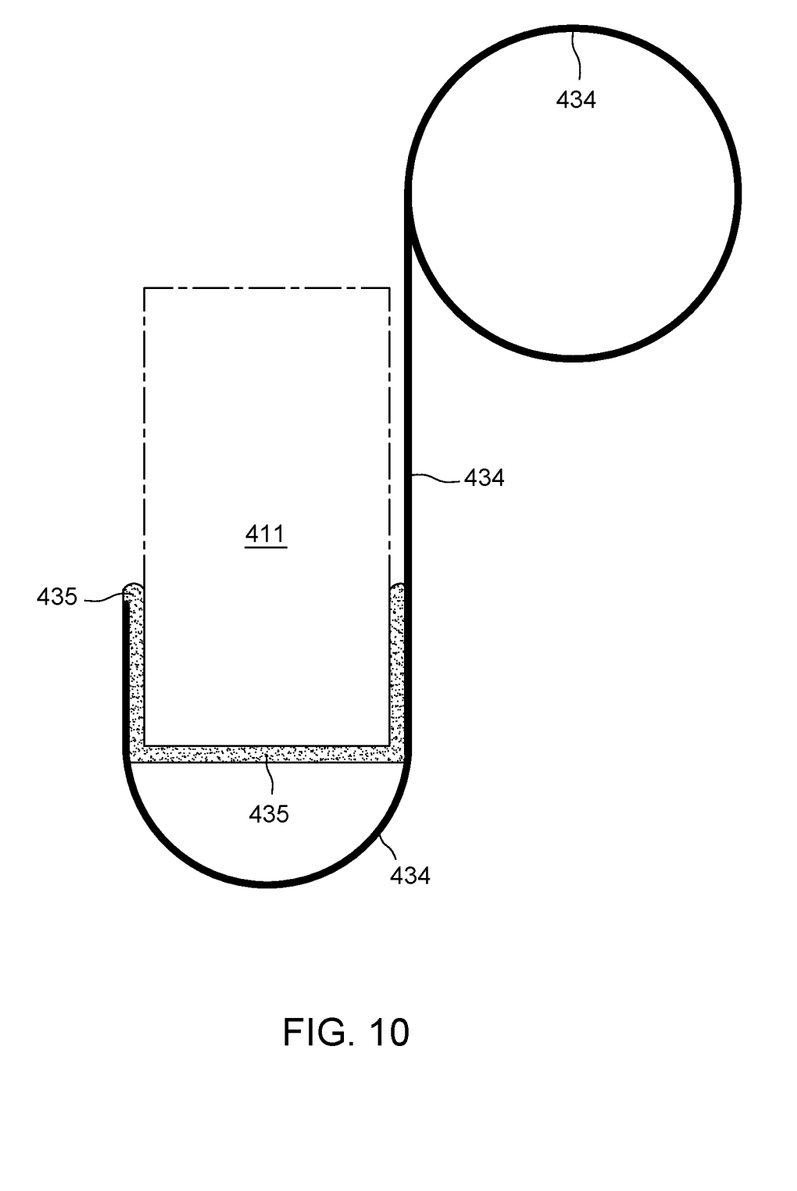
FIG. 10 illustrates a cross-sectional view of the tab of the brush holder having the friction enhancing material applied thereon, according to an aspect of the disclosure.

FIG. 8 illustrates a schematic version of the brush spring 434 with the friction enhancing material 435 located on the clip end of the brush spring. FIG. 9 illustrates a cross-sectional view of the brush spring 434 having the friction enhancing material 435 applied thereon. FIG. 10 illustrates a cross-sectional view of the tab 411 of the brush holder 430 having the friction enhancing material 435 applied thereon. In FIGS. 8-11 the friction enhancing material 435 is shown applied on either the brush holder 430, and specifically on the tab 411 of the brush holder, or on the clip portion or end of the brush spring 434. Either configuration will work as the friction enhancing material 435 is located at the interface between the brush spring and brush holder, and specifically where these two components attach to each other. While the friction enhancing material 435 provides a secure mount between the brush spring and brush holder, it does not prevent the replacement of the brush spring 434 when necessary.

Figure 11:
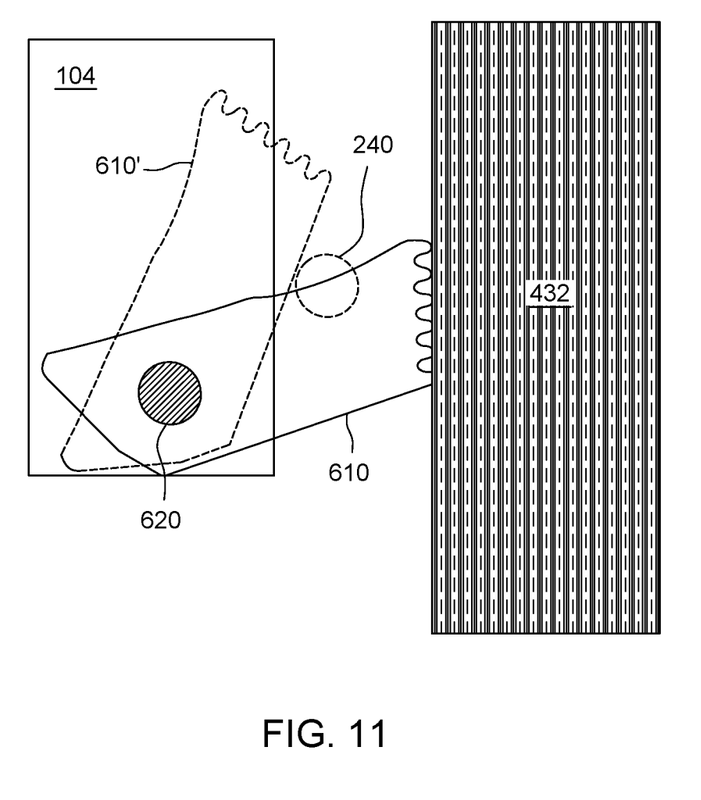
FIG. 11 illustrates a simplified side view of the cam in two positions, according to an aspect of the present disclosure.

FIG. 11 illustrates a simplified side view of the cam 610 in two positions, according to an aspect of the present disclosure. When the brush holder 104 is not fully inserted into the stationary support 102, the cam 610 will be rotated downward and into contact with brush 432. Once the brush holder 104 is fully inserted into stationary support 102, the cam 610' (shown in phantom) will be pushed up and away from the brush 432 by rod 240 (shown in phantom).

The spring 612 biases the cam member 610 towards the brush 432. As the brush 432 travels radially downward, through box 430, the cam member 610 contacts the brush 432 (via a wedge action) and prevents further downward movement of the brush 432. In effect, the cam member 610 prevents the brush from just falling through the box 430. The cam member 610 and spring 612 are configured so that the cam 610 will not damage the brush 432, and that brush 432 insertion and removal can be accomplished without the use of tools (i.e., it can be done easily by hand). In use, the brushes 432 are installed in the boxes 430 and the cam members 610 hold the brushes 432 in place. The brush holder 104 can now be inserted into the stationary support member 102. When the cam members 610 contact bar 240 (which occurs when the brush holder 104 is almost fully, if not completely, inserted into stationary support member 102), the cam members are pushed upward (by bar 240) and retract from the brushes 432. This action permits the brushes 432 to then drop onto the collector ring 120. Conversely, when the brush holder 104 is unlocked and withdrawn from the stationary support member 102 each cam member 610 will lose contact with the bar 240 and regain contact with its brush 432. This will ensure that the brush 432 loses contact with the collector ring 120 and is withdrawn with the brush holder 104. Additionally, when the brush holder 104 is withdrawn from the stationary support 102, the cam members 610 shown and described herein may allow for installation and/or replacement of brushes 432 using a single hand (e.g., one operator's hand) without the use of additional brush change tooling. This provides advantages, for example, safety and efficiency advantages, over the conventional systems and approaches.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A brush holder apparatus comprising:
a stationary support member having at least one groove, the stationary support member having a fork electrical connector, the stationary support member having a conductive bar configured to pass through a portion of a main body of the stationary support member, the conductive bar configured to provide electrical conductivity with a collector mount and the fork electrical connector;
a brush holder configured to be releasably affixed to the stationary support member, the brush holder having at least one rail configured to slide along the at least one groove, the brush holder having a knife electrical connector configured to mate with the fork electrical connector, and a brush spring configured to be clipped on the brush holder, the brush spring configured to press a brush against a collector of a dynamoelectric machine, the brush spring configured to be replaceable in the brush holder, at least one of the brush spring or brush holder having a friction enhancing material attached to an area where the brush spring attaches to the brush holder; and
wherein the stationary support member is configured for electrical connection to the collector mount and the brush holder is configured to retain the brush.

2. The brush holder apparatus of claim 1, wherein the friction enhancing material is on the brush spring in the area where the brush spring attaches to the brush holder.

3. The brush holder apparatus of claim 1, wherein the friction enhancing material is on the brush holder in the area where the brush holder attaches to the brush spring.

4. The brush holder apparatus of claim 1, the friction enhancing material comprising at least one of:
rubber, natural rubber, synthetic rubber, butadiene rubber, styrene-butadiene rubber, neoprene, polysulfide rubber, butyl rubber, or silicone.

5. The brush holder apparatus of claim 1, the brush holder further comprising:
a handle assembly comprising an electrically insulating handle having an electrically insulating guard configured to be located between the handle and brush connector leads, the handle assembly having a spring assembly mechanically connected to a brush terminal compression plate, the spring assembly configured to apply pressure to one or more brush terminals at least until the electrically insulating handle is in a locked position.

6. The brush holder apparatus of claim 5, the handle assembly further comprising:
a locking pin configured for cooperation with a tapered slot in the stationary support member, and
wherein the handle assembly is configured for rotation so that the locking pin is rotated into and out of the tapered slot.

7. The brush holder apparatus of claim 6, wherein the handle assembly is configured to be rotated about 90 degrees, a 0 degree position configured so that the locking pin is disengaged from the tapered slot so that the brush holder is removed from the stationary support member, and a 90 degree position configured so that the locking pin is engaged in the tapered slot so that the brush holder is fully locked into operating condition on the stationary support member.

8. The brush holder apparatus of claim 1, wherein the brush holder further comprises:

at least one cam member operably connected to a shaft near a bottom of the brush holder, the cam member configured to restrain the brush from sliding within the brush holder by pressing the brush against the brush holder until the brush holder is fully inserted in the stationary support member.

9. The brush holder apparatus of claim 8, wherein the stationary support member further comprises:
a bar located near a bottom end of the stationary support member, the bar configured to engage and restrain the at least one cam member so that the brush is free to move and contact a collector of a dynamoelectric machine once the brush holder is substantially fully inserted into the stationary support member.

10. The brush holder apparatus of claim 9, wherein the brush spring is configured to be located in-line with, or offset by 90 degrees from, the cam member.

11. The brush holder apparatus of claim 1, wherein the stationary support member further comprises:
a tapered slot configured for cooperation with a locking pin on the brush holder.

12. The brush holder apparatus of claim 1, wherein the conductive bar further comprises:
a plurality of holes configured to facilitate attachment of the stationary support member to the collector mount.

13. The brush holder apparatus of claim 12, wherein the conductive bar is configured to attach a plurality of stationary support members together.

14. The brush holder apparatus of claim 1, wherein the fork electrical connector is formed integrally with the conductive bar.

15. The brush holder apparatus of claim 1, wherein at least one of the stationary support member and the brush holder is comprised of a passivated or anodized aluminum or a passivated or anodized aluminum alloy, and wherein at least a portion of a surface of at least one of the stationary support member and the brush holder is configured to be substantially electrically insulating.

16. The brush holder apparatus of claim 1, wherein at least one of the stationary support member and the brush holder is comprised of a powder coated or painted aluminum, a powder coated or painted aluminum alloy, a ceramic coated metallic or ceramic coated non-metallic material, and wherein at least a portion of a surface of at least one of the stationary support member and the brush holder is configured to be substantially electrically insulating.

17. The brush holder apparatus of claim 1, wherein the brush holder is configured to accept a single brush or a plurality of brushes.

18. The brush holder apparatus of claim 1, wherein the brush holder is configured to clamp a brush terminal between a terminal compression plate and an opposing surface of the brush holder, and wherein the brush terminal is engaged manually or without the use of any tools.

19. The brush holder apparatus of claim 1, wherein the brush holder is configured to electrically and mechanically connect the knife electrical connector to a brush terminal; and
wherein the knife electrical connector and the brush terminal are electrically insulated from a handle of the brush holder.

20. A brush spring for a dynamoelectric machine, comprising:
the brush spring configured to be clipped on a brush holder, the brush spring configured to press a brush against a collector of a dynamoelectric machine, the brush spring configured to be replaceable in the brush holder, the brush spring having a friction enhancing material located in an area where the brush spring attaches to the brush holder; and wherein the friction enhancing material is at least one of, rubber, natural rubber, synthetic rubber, butadiene rubber, styrene-butadiene rubber, neoprene, polysulfide rubber, butyl rubber, or silicone.

\* \* \* \* \*